(12) United States Patent
Yamada

(10) Patent No.: US 6,438,553 B1
(45) Date of Patent: Aug. 20, 2002

(54) DISTRIBUTED JOB INTEGRATED MANAGEMENT SYSTEM AND METHOD

(75) Inventor: Kazuo Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,901

(22) Filed: Dec. 28, 1999

(30) Foreign Application Priority Data

Dec. 28, 1998 (JP) ............................................. 10-374485

(51) Int. Cl.⁷ .......................... G06F 17/30; G06F 15/16
(52) U.S. Cl. ...................... 707/10; 707/103; 707/104; 709/201; 709/203
(58) Field of Search .......................... 707/10, 103, 104; 709/201, 223

(56) References Cited

U.S. PATENT DOCUMENTS

| | | | | |
|---|---|---|---|---|
| 5,414,845 A | * | 5/1995 | Behm et al. ................. | 395/650 |
| 5,471,615 A | * | 11/1995 | Amatsu et al. .......... | 395/200.03 |
| 5,481,707 A | * | 1/1996 | Murphy, Jr. et al. ........ | 395/650 |
| 5,689,625 A | * | 11/1997 | Austin et al. ................ | 395/114 |
| 5,752,030 A | * | 5/1998 | Konno et al. ................ | 395/672 |
| 5,761,396 A | * | 6/1998 | Austin et al. ................ | 395/114 |
| 5,781,711 A | * | 7/1998 | Austin et al. ................ | 395/114 |
| 5,987,226 A | * | 11/1999 | Ishikawa et al. ............ | 395/112 |
| 6,130,757 A | * | 10/2000 | Yoshida et al. ............ | 358/1.15 |

FOREIGN PATENT DOCUMENTS

| | | |
|---|---|---|
| JP | 60077258 | 5/1985 |
| JP | 62219061 | 9/1987 |
| JP | 62287361 | 12/1987 |
| JP | 63286958 | 11/1988 |
| JP | 2-224169 | 9/1990 |
| JP | 02275563 | 11/1990 |
| JP | 06-059906 | 3/1994 |
| JP | 07-200496 | 4/1995 |
| JP | 08249294 | 9/1996 |
| JP | 09-146898 | 6/1997 |
| JP | 09259092 | 10/1997 |

OTHER PUBLICATIONS

Raymor et al., Minimization of supervisor conflict for multiprocessor computer systems, Symposium on the Simulation of Computer Systems IV, Aug. 10–12, 1976, pp. 60–61.*

* cited by examiner

*Primary Examiner*—Frantz Coby
(74) *Attorney, Agent, or Firm*—Foley & Lardner

(57) ABSTRACT

A distributed job integrated management system used in a networked computer system comprising a plurality of host computer systems coupled to a common network, and a plurality of heterogeneous distributed job management systems each processes inputted jobs by using the host computer systems. One of the distributed job management systems is used as a master distributed job management system and the rest of the plurality of distributed job management systems are used as slave distributed job management systems. The master distributed job management system determines allocation of resources of the host computer systems to the master distributed job management system and to said slave distributed job management systems, based on the condition of usage of the resources.

19 Claims, 11 Drawing Sheets

LOAD INFORMATION OF LSF SYSTEM HOSTS

| HOST_NAME | status | r15s | r1m | r15m | ut | pg | ls | it | tmp | swp | mem |
|---|---|---|---|---|---|---|---|---|---|---|---|
| host74 | ok | 3.9 | 3.9 | 3.9 | 75% | 42.8 | 4 | 8 | 1077M | 1079M | 79M |
| host78 | ok | 0.7 | 0.6 | 0.5 | 33% | 10.0 | 1 | 52 | 2022M | 1933M | 31M |
| host64 | ok | 1.0 | 1.0 | 1.0 | 51% | 0.0 | 1 | 46 | 2280M | 2282M | 248M |
| host81 | ok | 1.0 | 1.0 | 1.5 | 52% | 0.0 | 3 | 169 | 2422M | 2422M | 688M |
| host60 | ok | 1.1 | 1.1 | 1.1 | 55% | 20.4 | 9 | 6 | 793M | 795M | 31M |
| host77 | ok | 1.2 | 1.2 | 1.2 | 58% | 0.0 | 3 | 39 | 2958M | 2960M | 618M |
| host57 | ok | 1.3 | 1.2 | 1.1 | 57% | 12.7 | 3 | 22 | 2124M | 2126M | 32M |
| host58 | ok | 1.3 | 1.3 | 1.3 | 63% | 9.5 | 4 | 33 | 2254M | 2256M | 31M |
| host85 | ok | 1.4 | 1.4 | 1.4 | 67% | 13.6 | 1 | 180 | 2130M | 2132M | 31M |
| host72 | ok | 1.4 | 1.4 | 1.4 | 66% | 14.3 | 3 | 67 | 1590M | 1681M | 32M |
| host68 | ok | 1.4 | 1.3 | 1.3 | 59% | 6.4 | 3 | 0 | 3064M | 3064M | 625M |
| host56 | ok | 1.4 | 1.4 | 1.5 | 65% | 7.4 | 11 | 3 | 2706M | 2710M | 32M |
| host62 | ok | 2.0 | 1.9 | 1.8 | 99% | 91.6 | 1 | 0 | 1833M | 1835M | 31M |
| host67 | ok | 2.1 | 2.1 | 2.1 | 97% | 2.9 | 0 | 33 | 2114M | 2046M | 77M |
| host69 | ok | 2.1 | 2.1 | 2.0 | 100% | 0.1 | 1 | 40 | 2064M | 2066M | 672M |
| host75 | ok | 2.2 | 2.2 | 2.2 | 97% | 0.1 | 2 | 34 | 2452M | 2454M | 346M |
| host71 | ok | 2.2 | 2.2 | 2.2 | 100% | 2.7 | 2 | 74 | 2620M | 2622M | 60M |
| host70 | unavail | | | | | | | | | | |
| host84 | unavail | | | | | | | | | | |

FIG. 7 LSF RESOURCE RESERVATION

FIG. 9

FIG. 10   LSF RESOURCE RELEASE

BEFORE RELEASE

| JOBID | USER | STAT | QUEUE | FROM_HOST | EXEC_HOST | JOB_NAME | SUBMIT_TIME |
|---|---|---|---|---|---|---|---|
| 55386 | yamada | RUN | lobatch | host62 | host67 | *hcs623621 | Nov 17 21:11 |
| 55387 | yamada | RUN | lobatch | host62 | host71 | *hcs623621 | Nov 17 21:12 |
| 55388 | yamada | RUN | lobatch | host62 | host56 | *hcs623621 | Nov 17 21:12 |
| 55389 | yamada | RUN | lobatch | host62 | host67 | *23621LAST | Nov 17 21:13 |

AFTER RELEASE

| JOBID | USER | STAT | QUEUE | FROM_HOST | EXEC_HOST | JOB_NAME | SUBMIT_TIME |
|---|---|---|---|---|---|---|---|

PRIOR ART

DISTRIBUTED JOB INTEGRATED MANAGEMENT SYSTEM AND METHOD

FIELD OF THE INVENTION

The present invention relates generally to a distributed job integrated management system which manages a plurality of distributed job management systems and a method thereof. More particularly, the present invention relates to an integrated management system and a method thereof which do not require dividing network resources for different distributed job management systems and in which network resources are efficiently utilized to realize high speed data processing.

BACKGROUND OF THE INVENTION

Figure 12:
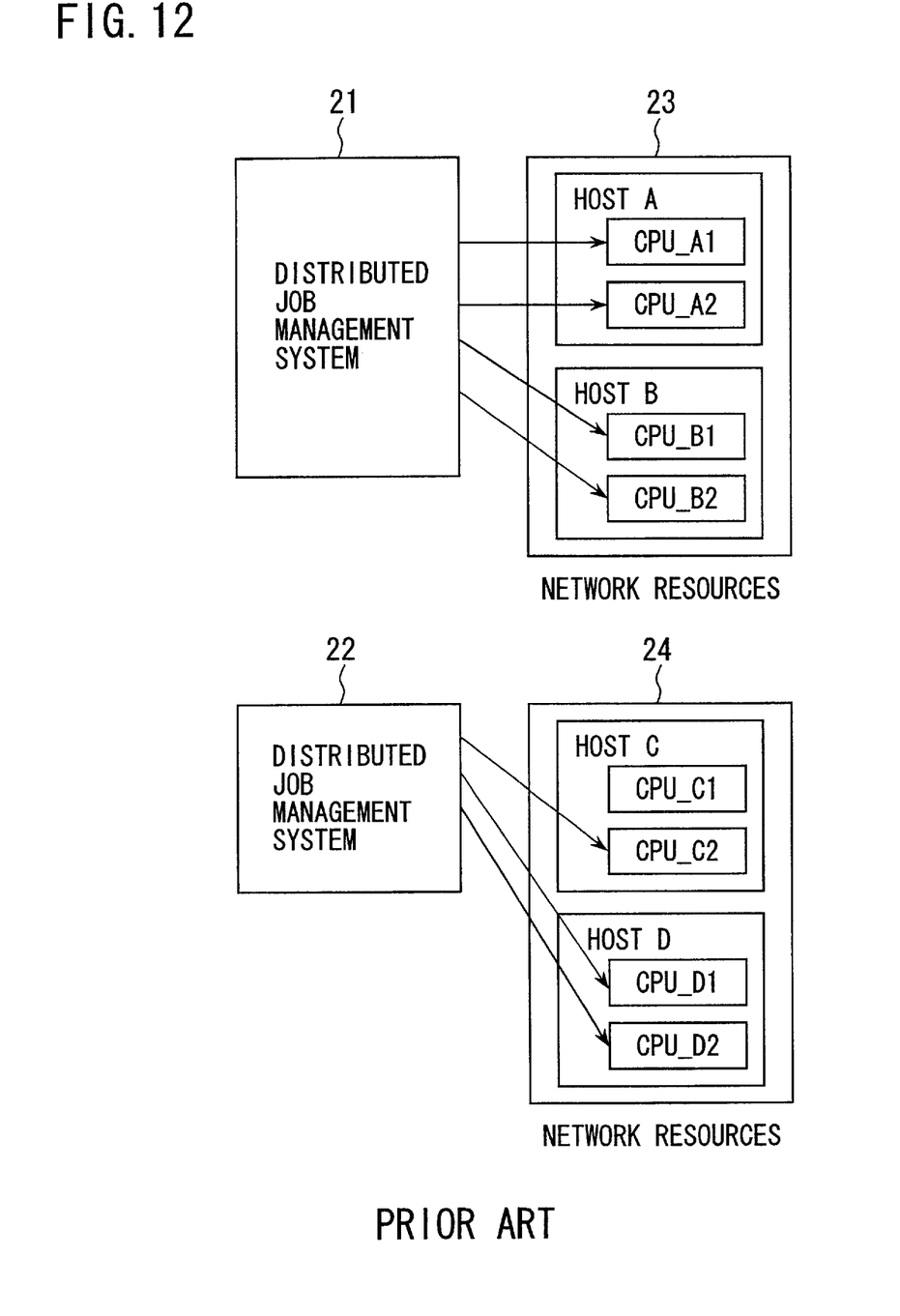
FIG. 12 is a block diagram showing a conventional system in which two different distributed job management systems are operating on a network.

FIG. 12 shows a structure of a conventional job processing system in which two different distributed job management systems are operating on a network. Network resources 23 are composed of a plurality of host systems, for example, a host system A and a host system B. Also, network resources 24 are composed of a plurality of host systems, for example, a host system C and a host system D. Each of the host systems comprise two CPU's. There are two different distributed job management systems utilizing these host systems. The network resources 23 having the host system A and the host system B are managed or administered by the distributed job management system 21. The network resources 24 having the host system C and the host system D are managed or administered by the distributed job management system 22.

A distributed job management system is a system which allocates a CPU_A1 to a job "a", when the job "a" is to be performed, and allocates a CPU_A2 to a job "b", when the job "b" is to be performed, thereby having both jobs processed in parallel. That is, the job "a" and the job "b" are processed by using the CPU_A1 and the CPU_A2, respectively. In this case, when processing of the job "b", for example, is finished earlier, the CPU_A2 becomes an idle condition. Therefore, it becomes possible to allocate the CPU_A2 to a new job "c" to perform it. Thereby, the distributed job management system enables a whole processing to be performed quickly.

Concretely, the distributed job management system itself monitors the rate of operation of each CPU of the host systems which the distributed job management system administrates, and grasps the condition of execution of each job. Also, the distributed job management system grasps which job is allocated to which CPU, the condition of processing, the condition of execution of jobs, and the like. That is, the distributed job management system performs administration, monitoring, processing and analysis on the resources. By performing the analysis, it is possible for the distributed job management system itself to intelligently manage or administrate the CPU's of the host systems, i.e., the resources, such that, for example, when any CPU is idle or when processing load of any CPU is light, the distributed job management system makes the processing load of that CPU full.

An example of a distributed job management system is described in Japanese patent laid-open publication No. 2-224169. The Japanese patent laid-open publication No. 2-224169 discloses an invention of a processing distributing system having a plurality of computer systems connected to a network. In the processing distributing system, a task management control portion divides a job injected to the system into tasks. The tasks are transferred to other computer systems to perform processing thereof according to parameters of the divided jobs, and processing result of the tasks processed by the other computer systems are integrated with the processing result of the tasks processed by its own computer system. By distributing the load within the network, resources in the network can be effectively utilized, processing load of each resource can be decreased, and waiting time of each job for processing can be shortened. Thereby, a turn around time (TAT) can be reduced.

However, in any of the above-mentioned conventional technique, the distributed job management systems respectively perform mutually different processing and are independent of each other. Therefore, it is impossible to administrate and monitor all the jobs which are inputted from one distributed job management system, from the other distributed job management system. Also, resources such as hardware and the like are completely separated every distributed job management system. As a result, even when, for example, the CPU_C2 of the distributed job management system 22 is not so fully utilized but the distributed job management system 21 is fully utilizing the CPU_A1, the CPU_A2, the CPU_B1 and the CPU_B2 and there is always no idle time in these CPUs, the distributed job management system 21 can not utilize the CPU_C2, because the CPU's are completely separated every system.

As mentioned above, in case there are a plurality of different distributed job management systems on a network, since the distributed job management systems respectively use different job management method, it is impossible to administrate and monitor all the jobs given by one distributed job management system, from the other distributed job management system. It is necessary to statically separate the network resources every distributed job management system. Therefore, in the conventional technique, there is a disadvantage that jobs introduced or injected from every distributed job management systems can not share all the network resources.

Also, since the jobs injected can not share all the network resources, even when load of jobs injected from one distributed job management system is low, the turnaround time (TAT) of jobs introduced from any other distributed job management system is not shortened.

SUMMARY OF THE INVENTION

Therefore, it is an object of the present invention to obviate the disadvantages of a conventional job management system.

It is another object of the present invention to provide a distributed job integrated management system in which it is not necessary to separate network resources every different distributed job management system and, thereby, the network resources can be effectively utilized.

It is still another object of the present invention to provide a distributed job integrated management system in which jobs can be efficiently processed at high speed.

According to an aspect of the present invention, there is provided a distributed job integrated management system used in a networked computer system which comprises a plurality of host computer systems coupled to a common network, and a plurality of heterogeneous distributed job management systems each processes inputted jobs by using the host computer systems, wherein one of the distributed job management systems is used as a master distributed job management system and the rest of the plurality of distributed job management systems are used as slave distributed job management systems, and the master distributed job management system determines allocation of resources of the host computer systems to the master distributed job management system and to the slave distributed job management systems, based on the condition of usage of the resources of the host computer systems.

In this case, it is preferable that inputted jobs are allocated to the slave distributed job management systems or to the master distributed job management system via the master distributed job management system.

It is also preferable that the master distributed job management system has a master job queue for jobs to be processed by the master distributed job management system and a slave job queue for jobs to be processed by the slave distributed job management system, and inputted jobs are queued into the master job queue or into the slave job queue via the master distributed job management system.

It is advantageous that jobs are inputted from each of the plurality of host computer systems.

It is also advantageous that jobs can be inputted from each of the host computer systems with a command designating whether the jobs are to be processed by the slave distributed job management system or by the master distributed job management system.

It is further advantageous that jobs can be inputted from each of the host computer systems with a command designating a quantity of resources required for processing the jobs.

It is preferable that, when there are a plurality of the slave distributed job management systems, the master distributed job management system determine which of the slave distributed job management systems processes the jobs according to the condition of usage of network resources, so that jobs are uniformly distributed among the resources or among the slave distributed job management systems.

It is also preferable that the distributed job integrated management system further comprises: a resource reservation portion which gives information on a number of CPUs in the host computer systems required for jobs of the slave distributed job management system to the master distributed job management system; a resource allocation portion which allocates resources for the jobs of the slave distributed job management system by using a host name list corresponding to the number of CPU's required for jobs of the slave distributed job management system; a slave main command injection portion which inputs a slave main command for processing jobs of the slave distributed job management system into the master distributed job management system; a slave main command monitoring portion which monitors execution of the slave main command; and a resource releasing portion which releases resources used for processing the jobs of the slave distributed job management system.

It is also preferable that the resource reservation portion issues dummy jobs to reserve resources used for processing jobs of the slave distributed job management system based on the number of CPU's required for jobs of the slave distributed job management system.

According to another aspect of the present invention there is provided a method of distributed job integrated management system in a networked computer system comprising a plurality of host computer systems coupled to a common network, and a plurality of heterogeneous distributed job management systems each processes inputted jobs by using the host computer systems. In the method of distributed job integrated management, one of the distributed job management systems is used as a master distributed job management system and the rest of the plurality of distributed job management systems are used as slave distributed job management systems, and the master distributed job management system determines allocation of resources of the host computer systems to the master distributed job management system and to the slave distributed job management systems, based on the condition of usage of the resources of the host computer systems.

It is preferable that inputted jobs are allocated to the slave distributed job management systems or to the master distributed job management system via the master distributed job management system.

It is also preferable that the master distributed job management system has a master job queue for jobs to be processed by the master distributed job management system and a slave job queue for jobs to be processed by the slave distributed job management system, and inputted jobs are queued into the master job queue or into the slave job queue via the master distributed job management system.

In this case, it is possible to input jobs from each of the plurality of host computer systems.

It is also possible to input jobs from each of the host computer systems with a command designating whether the jobs are to be processed by the slave distributed job management system or by the master distributed job management system.

It is further possible to input jobs from each of the host computer systems with a command designating a quantity of resources required for processing the jobs.

It is preferable that, when there are a plurality of the slave distributed job management systems, the master distributed job management system determine which of the slave distributed job management systems processes the jobs according to the condition of usage of network resources, so that jobs are uniformly distributed among the resources or among the slave distributed job management systems.

It is also preferable that the method further comprises: providing information on a number of CPU's in the host computer systems required for jobs of the slave distributed job management system to the master distributed job management system; allocating resources for the jobs of the slave distributed job management system by using a host name list corresponding to the number of CPU's required for jobs of the slave distributed job management system; inputting a slave main command for processing jobs of the slave distributed job management system into the master distributed job management system; monitoring execution of the slave main command; and releasing resources used for processing the jobs of the slave distributed job management system.

It is also preferable that the providing information on a number of CPU's comprises issuing dummy jobs corresponding to the number of CPU's required for jobs of the slave distributed job management system to reserve resources used for processing jobs of the slave distributed job management.

According to still another aspect of the present invention, there is provided a storage medium storing a computer program for configuring a distributed job integrated management system used in a networked computer system which comprises a plurality of host computer systems coupled to a common network, and a plurality of heterogeneous distributed job management systems each processes inputted jobs by using the host computer systems, wherein one of the distributed job management systems is used as a master distributed job management system and the rest of the plurality of distributed job management systems are used as slave distributed job management systems, and the master distributed job management system determines allocation of resources of the host computer systems to the master distributed job management system and to the slave distributed job management systems, based on the condition of usage of the resources of the host computer systems.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, embodiments of the present invention will now be described in detail.

Figure 1:
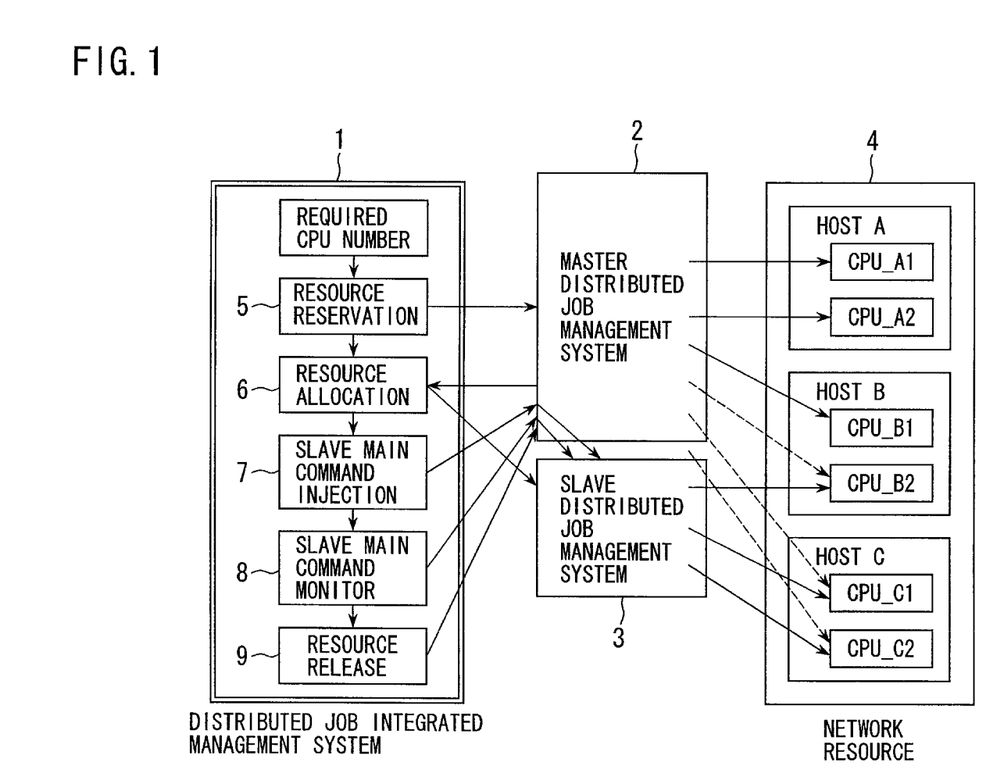
FIG. 1 is a block diagram illustrating a system structure of a distributed job integrated management system as an embodiment of the present invention.

FIG. 1 illustrates a configuration of a networked computer system including a distributed job integrated management system according to an embodiment of the present invention. FIG. 1 shows a system configuration in which, for example, two different distributed job management systems are operating on a network. One of the distributed job management systems functions as a master distributed job management system 2 and the other distributed job management system functions as a slave distributed job management system 3. These master and slave distributed job management systems 2 and 3, respectively, are integrally managed or administrated by a distributed job integrated management system 1.

In FIG. 1, there are shown network resources 4. Among these network resources 4, some of them are temporarily allocated to the master distributed job management system 2 and the others are temporarily allocated to the slave distributed job management system 3. However, in the present invention, the master distributed job management system 2 can allocate any of the network resources 4 to the jobs for its own, i.e., the master distributed job management system 2, and to the jobs for the slave distributed job management system 3, taking the condition of usage of the whole network resources 4 into consideration.

Network resources 4 comprises a plurality of host systems, for example, a host system A, a host system B and a host system C connected to a common network not shown in the drawing. Each of the host systems is, for example, a workstation and the like. These host systems A through C are administrated by the master distributed job management system 2. In FIG. 1, each of the host systems comprise two CPU's (central processing units), that is, the host system A comprises a CPU_A1 and a CPU_A2 the host system B comprises a CPU_B1 and a CPU_B2, and the host system C comprises a CPU_C1 and a CPU_C2.

The distributed job integrated management system 1 comprises a resource reserving portion 5, a resource allocating portion 6, a slave main command injecting portion 7, a slave main command monitoring portion 8, and a resource releasing portion 9.

The resource reserving portion 5 has a function of determining from a command for injecting or inputting jobs and the like whether an inputted job or jobs are to be processed by the master distributed job management system 2 or by the slave distributed job management system 3. When the jobs are to be processed by the slave distributed job management system 3, the resource reserving portion 5 provides information on the number of CPU's necessary for processing jobs of the slave distributed job management system 3 to the master distributed job management system 2.

The resource allocating portion 6 allocates resources for the slave distributed job management system 3 from host name lists corresponding to the number of the CPU's. The slave main command injecting portion 7 injects or gives a slave main command to the master distributed job management system 2. The slave main command monitoring portion 8 is a portion which monitors execution of the slave main command. The resource releasing portion 9 is a portion which releases the resources reserved for the master distributed job management system 2 at a point in time when execution of the slave main command is finished.

Here, operation of the system of FIG. 1 will be described briefly.

First, when a job or jobs are to be processed in the system of FIG. 1, a predetermined command is inputted from any of the host systems. The command includes information on a number of CPU's necessary for the jobs and information on the distributed job management system which should process the jobs, that is, information on whether the master distributed job management system 2 or the slave distributed job management system 3 should process the jobs.

The inputted command is interpreted in the resource reserving portion 5 of the distributed job integrated management system 1 to determine whether the jobs are to be processed by the master distributed job management system 2 or the slave distributed job management system 3. In the master distributed job management system 2, there are provided a master job queue for inputting jobs to be processed on the master side, and a slave job queue for inputting jobs to be processed on the slave side, both not shown in the drawing. When it is determined by the resource reserving portion 5 that the inputted command indicates jobs to be processed by the master distributed job management system 2, the jobs are inputted to the master job queue. The master distributed job management system 2 performs processing of the jobs sequentially outputted from the master job queue, as usual by using available CPU's.

When the inputted command is a slave main command and indicates jobs to be processed by the slave distributed job management system 3, the jobs are inputted to the slave job queue and processing is performed as follows.

The resource reserving portion 5 provides the number of CPU's necessary for the jobs of the slave distributed job management system 3 to the master distributed job management system 2, and dummy jobs are issued from the resource reserving portion 5, thereby reserving the resources, for example, CPU_B2, CPU_C1, and CPU_C2. In FIG. 1, dotted lines illustrate issuance of dummy jobs.

In the resource allocating portion 6, from a host name list corresponding to the number of CPU's, resource data of the slave distributed job management system 3 is obtained, and the resources (CPU_B2, CPU_C1, and CPU_C2) are allocated.

The slave main command injecting portion 7 injects the slave main command into the master distributed job management system 2.

From the slave distributed job management system 3, children distributed jobs whose parent is the slave main command are issued.

In the slave main command monitoring portion 8, completion of an execution of the slave main command is monitored. When the execution of the slave main command is finished, the resource releasing portion 9 kills dummy jobs to the master distributed job management system 2, and releases the reserved resources (CPU_B2, CPU_C1, and CPU_C2).

Figure 2:
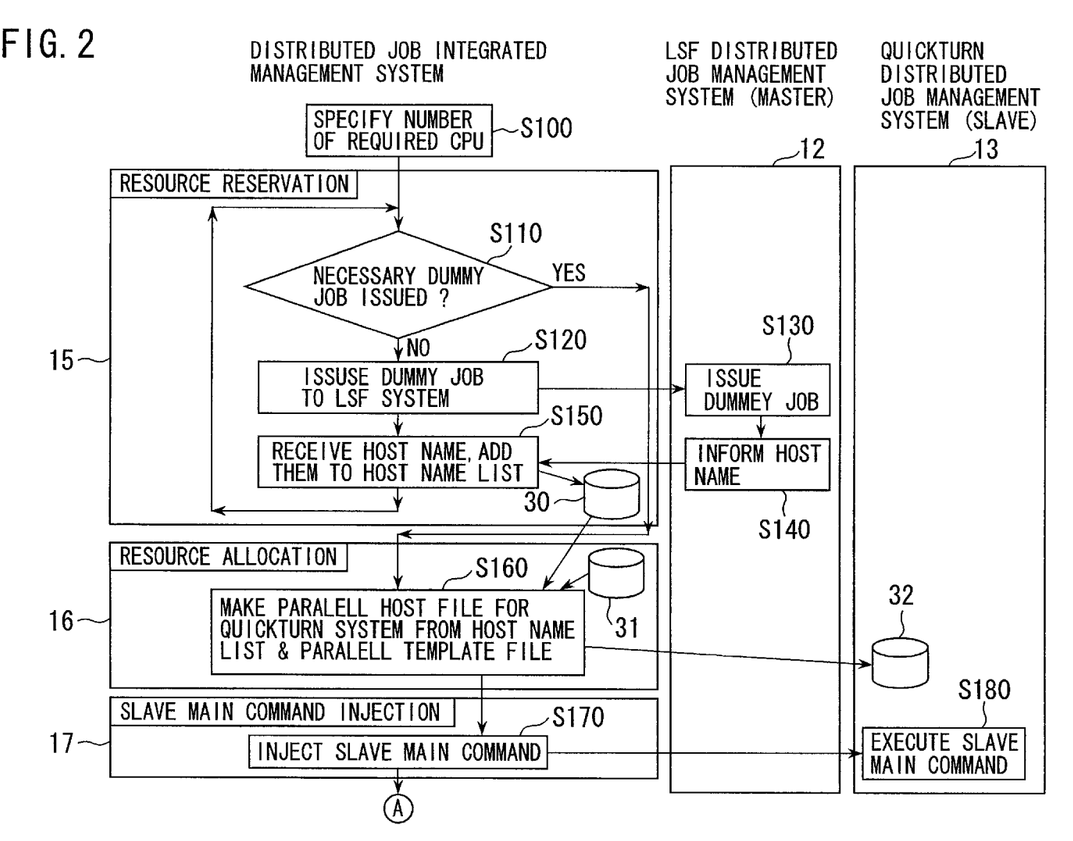
FIG. 2 is a flowchart illustrating detailed operation of the distributed job integrated management system of FIG. 1.
Figure 3:
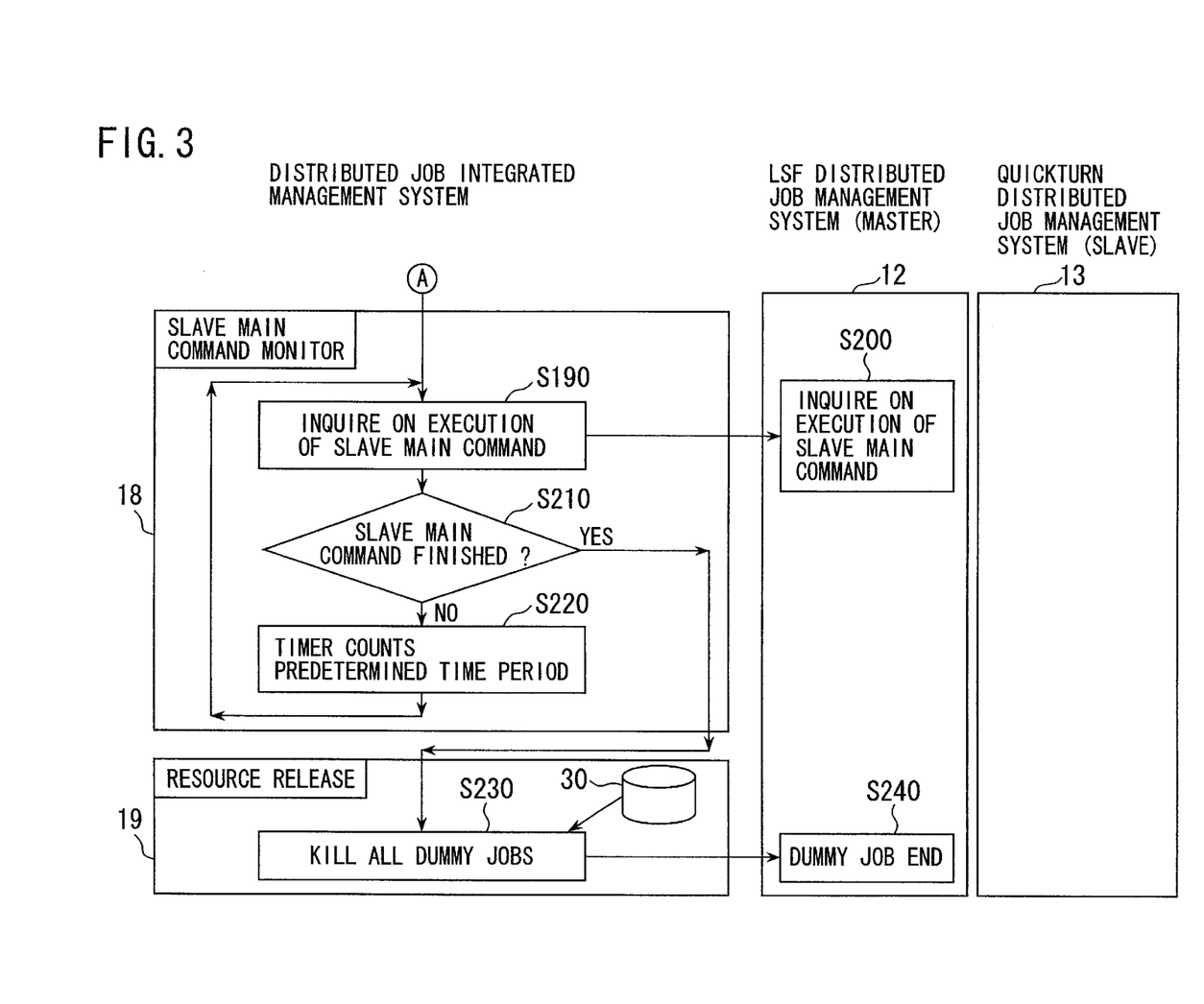
FIG. 3 is a flowchart illustrating detailed operation of the distributed job integrated management system of FIG. 1 performed after the operation of FIG. 2.

Now, with reference to FIG. 2 and FIG. 3, operation of the system according to the present invention will be explained further in detail based on a more concrete example. FIG. 2 and FIG. 3 are flow charts showing operation of the distributed job integrated management system in further detail. For convenience of description, components of the system in FIG. 2 and FIG. 3 are designated by using reference symbols different from those of FIG. 1.

In this example, as the master distributed job management system 12, LSF (Load Sharing Facility) system provided by Platform Computing Corporation, in Canada, is utilized. The LSF can perform administration, monitoring and analysis on loads on a network to which heterogeneous computers are coupled, and supervises a plurality of computers as one system to effectively utilize network resources. By using the LSF, it is possible to use a network having different kinds of computers coupled thereto as one system. Hereafter, the master distributed job management system 12 is called an LSF distributed job management system 12.

As the slave distributed job management system 13, a distributed job management system provided by Quickturn Design Systems Corporation, in the U.S.A., is utilized in this embodiment. Hereafter, the slave distributed job management system 13 is called a Quickturn distributed job management system 13.

Figure 4:
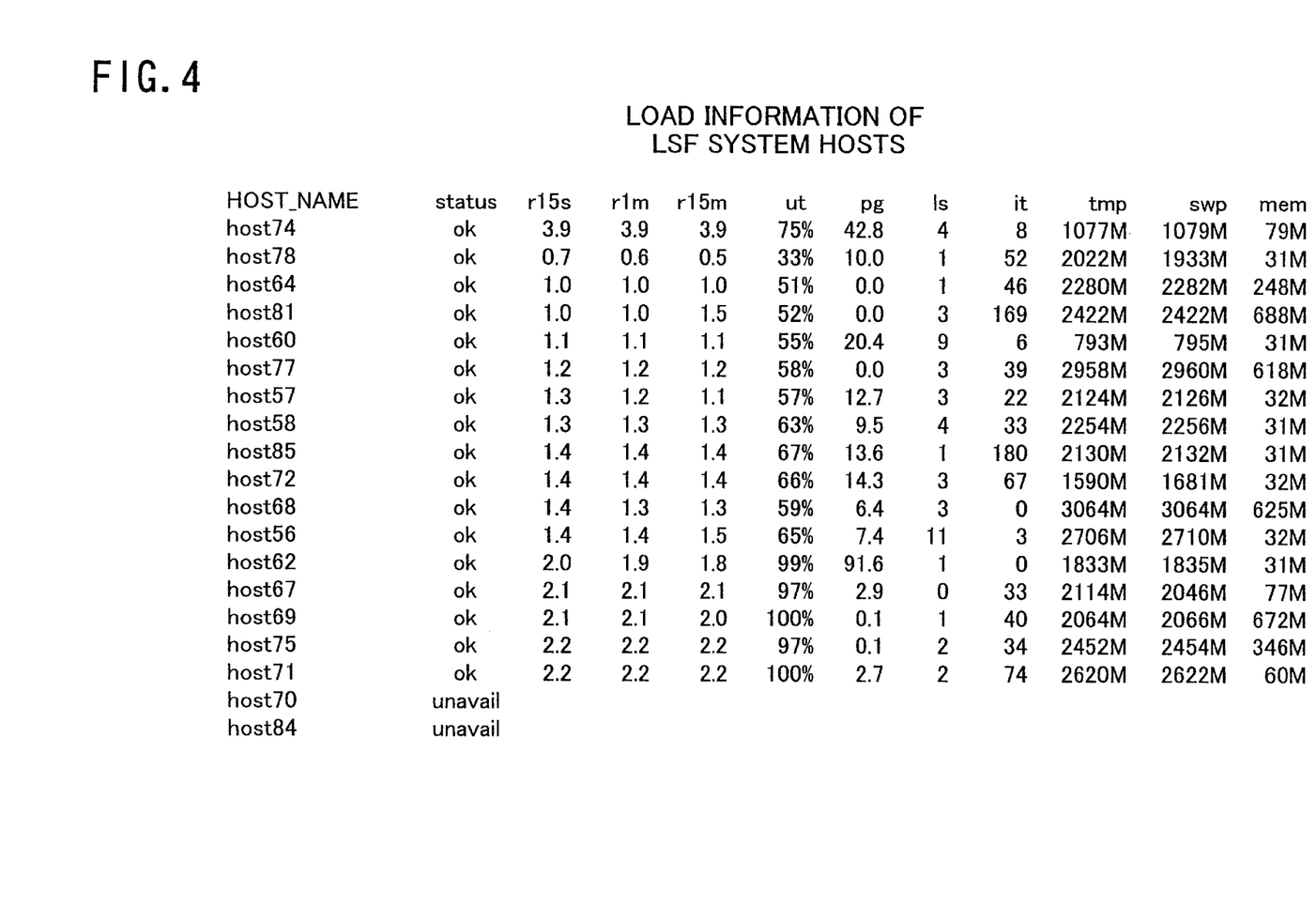
FIG. 4 is an illustration showing host load information of an LSF distributed job management system.

FIG. 4 shows information on host load of the LSF distributed job management system 12. In FIG. 4, an item "status" indicates a status of a host system and, in this item, "ok" shows usable and "unavail" shows unavailable or unusable. An item "r15s" shows a length of CPU execution averaged by 15 seconds index, "r1m" shows a length of CPU execution averaged by 1 minute index, "r15m" shows a length of CPU execution averaged by 15 minutes index. Also, an item "ut" shows a CPU utilization rate, an item "pg" shows a memory paging rate, an item "ls" shows number of log in users, an item "it" shows an idle time in minutes, an item "tmp" shows a temporary free capacity of a disk storage, an item "swp" shows a capacity of free swap area, and an item "mem" shows a free memory capacity.

Figure 5:
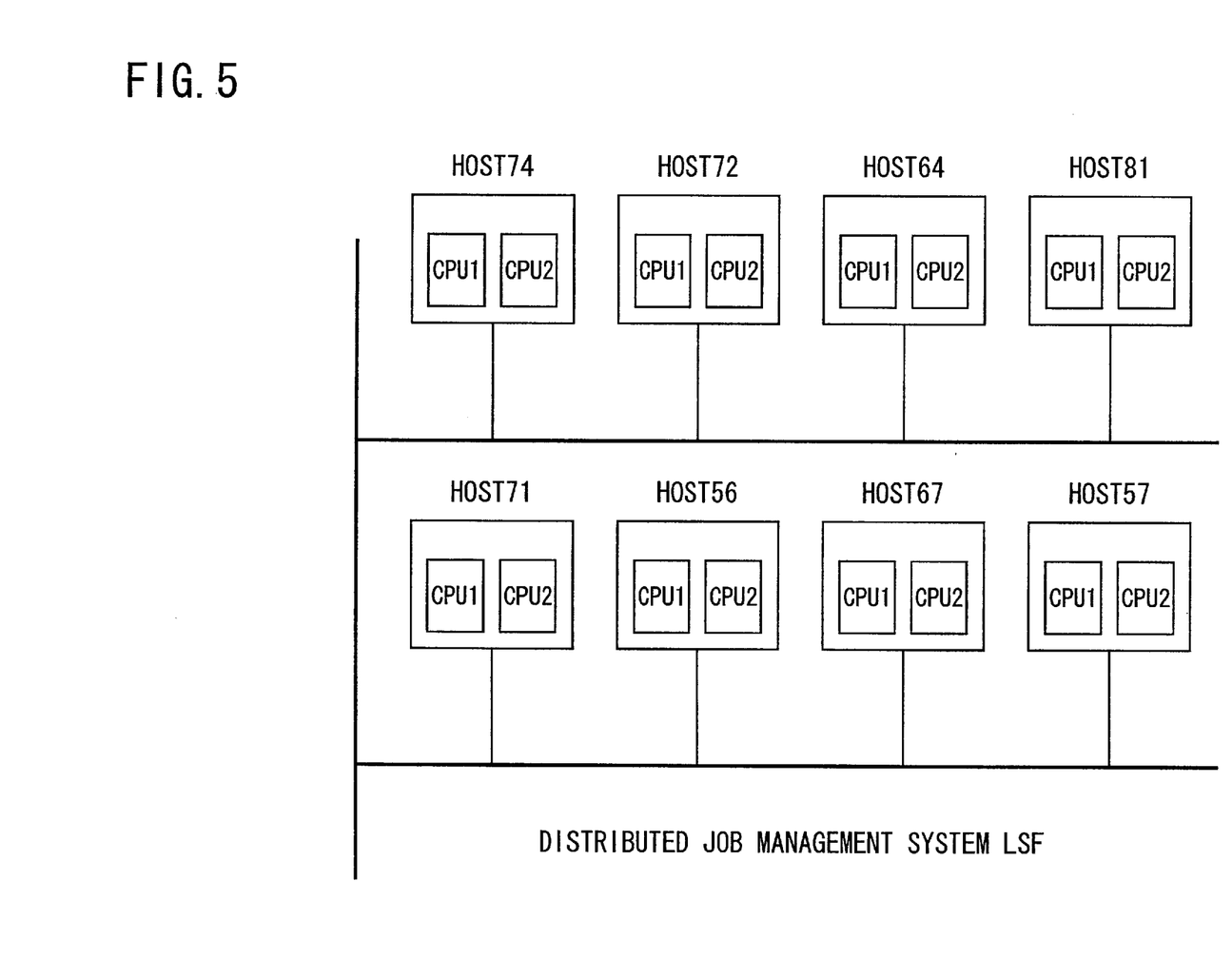
FIG. 5 is a block diagram illustrating a portion of hosts managed by the LSF distributed job management system.

FIG. 5 illustrates a structure of a portion of host systems managed by the LSF distributed job management system 12. In FIG. 5, it is shown that host74, host72, host64, host81, host71, host56, host67 and host57 are coupled by a network.

Figure 6:
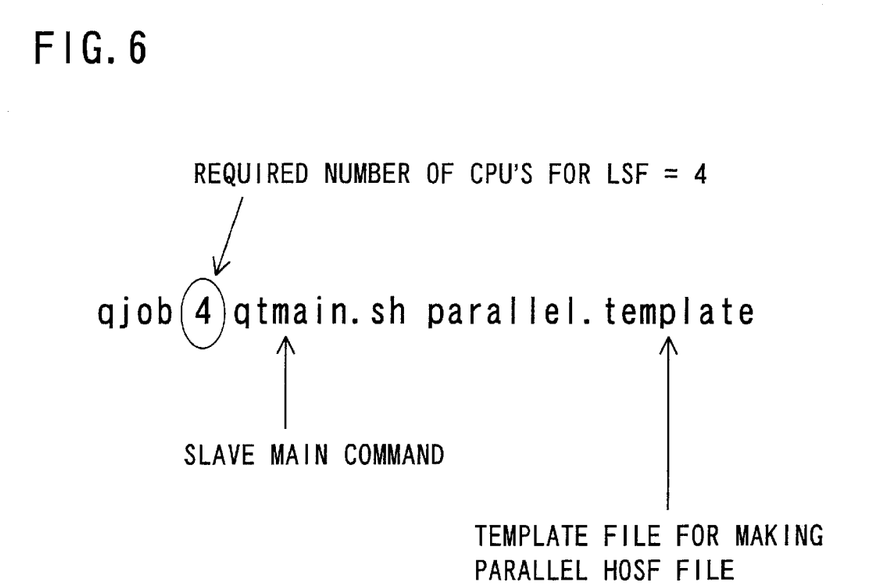
FIG. 6 is an illustration showing an example of a command for activating a program.

In operation, first, in any of the host computer systems in the LSF distributed job management system 12, a program for configuring the distributed job integrated management system according to the present invention is activated together with the indication the number of required CPU's (step S100). The program may be stored, for example, in any storage medium, such as a hard disk and the like of a host computer system, for example, a workstation. FIG. 6 shows an example of a command for activating the program. In this command, the head item "qjob" is a command name of the program for constructing the distributed job integrated management system according to the present invention. The first argument "4" shows the number of CPU's required. The second argument "qtmain. sh" shows a slave main command name provided to the Quickturn distributed job management system 13. The third argument "parallel. template" shows a parallel template file name for making a parallel host file used in the Quickturn distributed job management system 13.

Then, in the resource reservation portion 15, it is determined if dummy jobs for the number of necessary CPU's are issued (step S110). If the dummy jobs are not issued, dummy jobs are issued to the LSF distributed job management system 12 and, reserves the resources for the Quickturn distributed job management system 13 (step S120).

Figure 7:
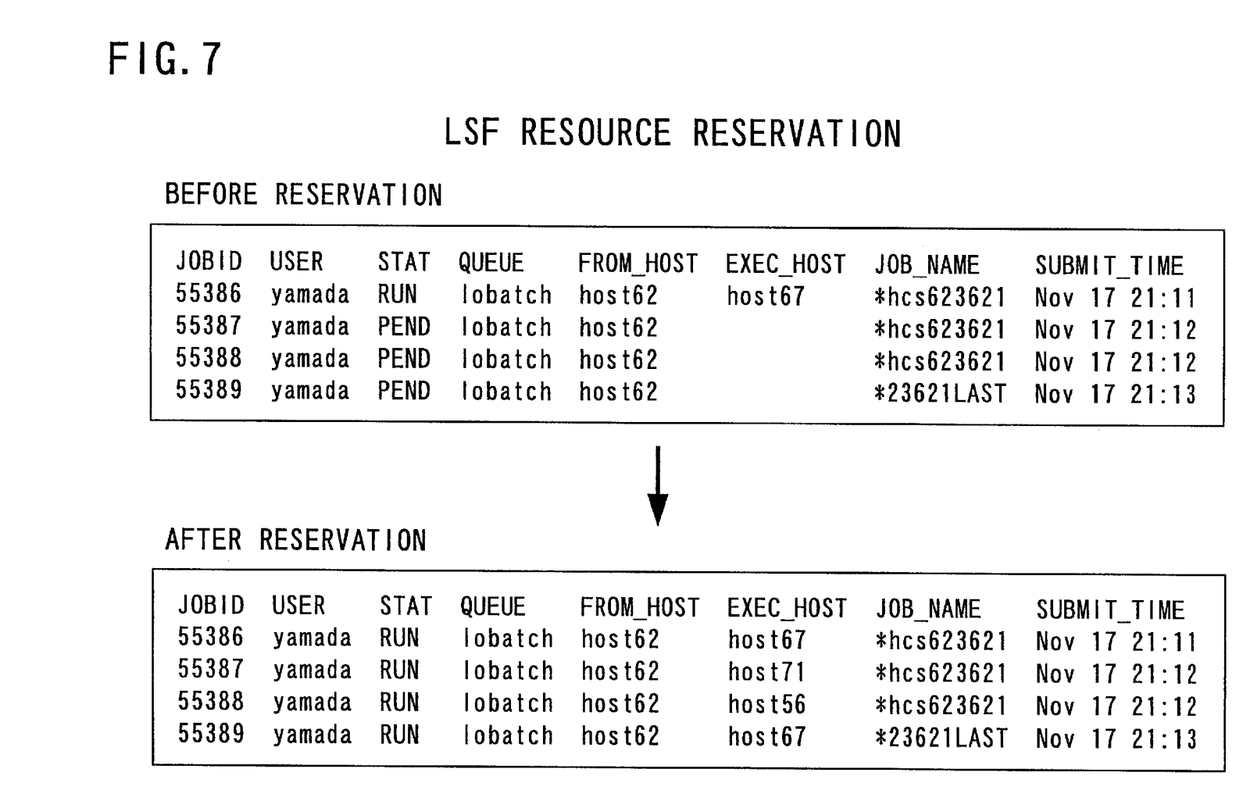
FIG. 7 is an illustration showing a condition of reservation of resources in the LSF distributed job management system.

FIG. 7 illustrates a condition of reservation of resources in the LSF distributed job management system 12. In FIG. 7, an item "STAT" indicates a condition of job execution in which "RUN" shows a condition in which a job is being executed, and "PEND" shows a condition in which a job is pending. An item "FROM_HOST" shows a host computer system into which the command shown in FIG. 6 is injected, and an item "EXEC_HOST_" shows a host computer system which executes processing of jobs.

As mentioned above, in the resource reservation portion 15, when a dummy job is issued, the LSF distributed job management system 12 issues the dummy jobs (step S130), and informs names of host computer systems into which the dummy jobs are injected (step S140) to the distributed job integrated management system. The resource reservation portion 15 receives the host names of the reserved CPU and add the names to a host name list 30 (step S150).

Figure 8:
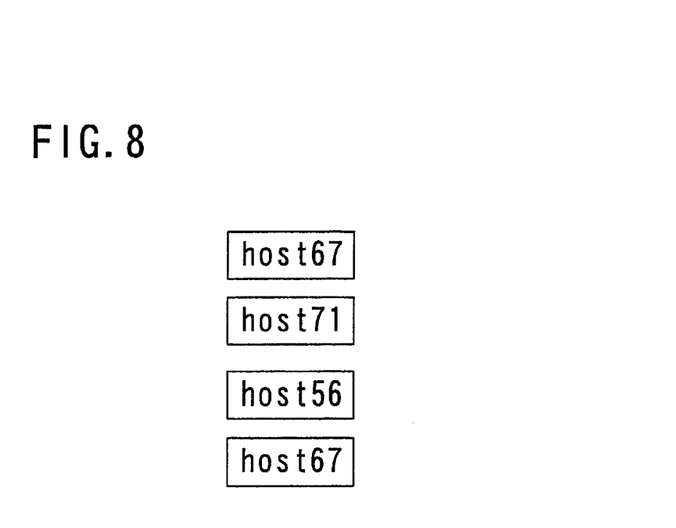
FIG. 8 is an illustration showing host names informed from the LSF distributed job management system.

FIG. 8 illustrates an example of the host names informed from the LSF distributed job management system 12. In FIG. 8, an example is shown in which host names "host67", "host71", "host56" and "host67" are informed, that is, four CPU's and three hosts are informed. In the host67, two CPU's are reserved.

After receiving the host names of the reserved CPU's from the LSF distributed job management system and adding the names to the host name list 30, the resource allocating portion 16 makes a parallel host file 32 for the Quickturn distributed job management system 13 from the host name list 30 and a parallel template file 31 (step S160).

The parallel template file 31 is a template file which is used when resources are allocated in the Quickturn distributed job management system 13, and is a file for making a parallel host file for allocating actual resources according to the number of CPU's.

Jobs in the Quickturn distributed job management system 13 is distributed according to the parallel host file. The parallel host file must be made in accordance with the number of used CPU's. The parallel template file mentioned above is a file which is previously made independent of the number of CPU's, and is prepared commonly to its jobs.

Figure 9:
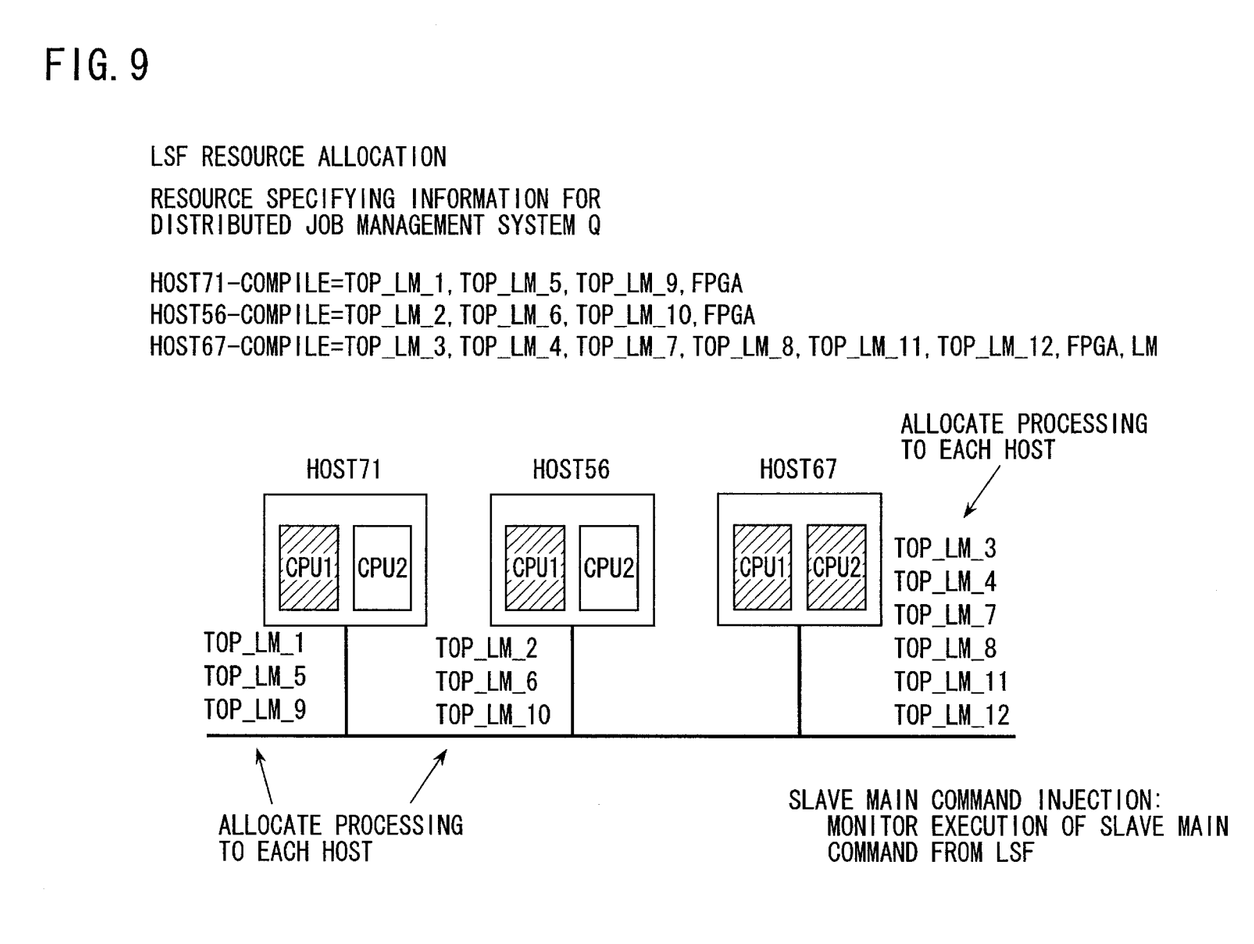
FIG. 9 is an illustration showing information of resource allocation for Quickturn distributed job management system and showing a condition in which processing is allocated to each job.

FIG. 9 shows resource allocation information for the Quickturn distributed job management system 13, and shows a condition in which processing is allocated to each host. In the parallel host file 32, the resource information shown in FIG. 9 is included. In FIG. 9, "host71", "host56" and "host67" are host names added to the host name list 30. To the host71, three processing top_LM_1, top_LM_5, top_LM_9 are allocated. To the host56, three processing top_LM_2, top_LM_6, top_LM_10 are allocated. Since there are two CPU's, six processing top_LM_3, top_LM_4, top_LM_7, top_LM_8, top_LM_11, top_LM_12 are allocated to the host 67.

Then, in the slave main command injecting portion 17, a slave main command is injected (step S170), and the slave main command is executed in the Quickturn distributed job management system 13 (step S180).

Thereafter, in the slave main command monitoring portion 18, an inquiry on the execution of the slave main command is made to the LSF distributed job management system 12 every predetermined time (step S190 through step S220). After execution of the slave main command is finished, in the resource releasing portion 19, all the dummy jobs are killed by using the host name list 30 (step S230), and the dummy jobs are finished (step S240).

Figure 10:
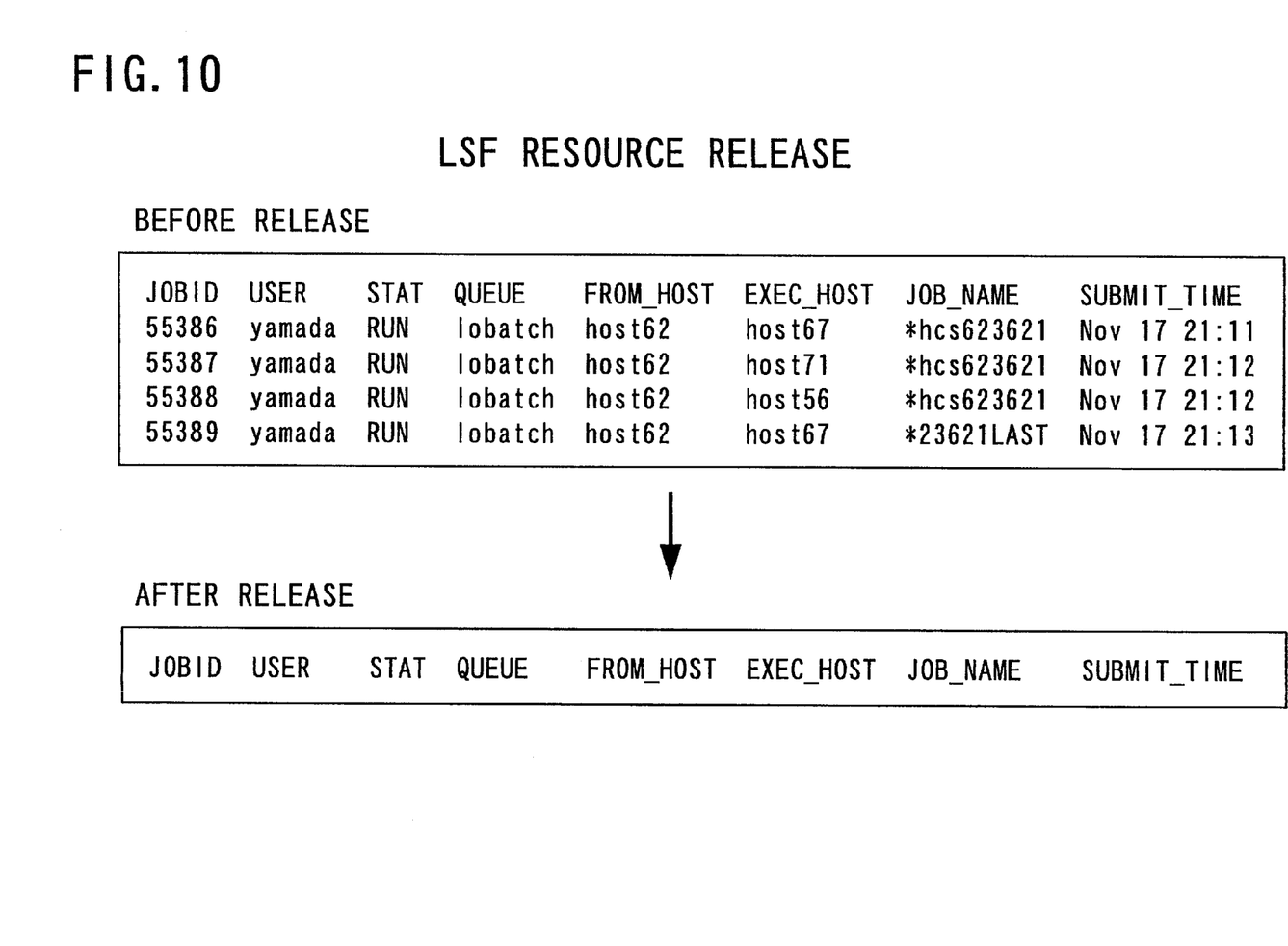
FIG. 10 is an illustration showing a condition of resource release in the LSF distributed job management system.

FIG. 10 shows a condition of resource release in the LSF distributed job management system 12, and shows a condition before releasing the resources and after releasing the resources.

In this way, according to this example, network resources required for the jobs on the side of the Quickturn distributed job management system 13 are dynamically allocated between the LSF distributed job management system 12 and the Quickturn distributed job management system 13. During a time when jobs are not executed in the Quickturn distributed job management system 13, other jobs injected from the LSF distributed job management system 12 can occupy the network resources.

Another embodiment of the present invention will now be described.

Figure 11:
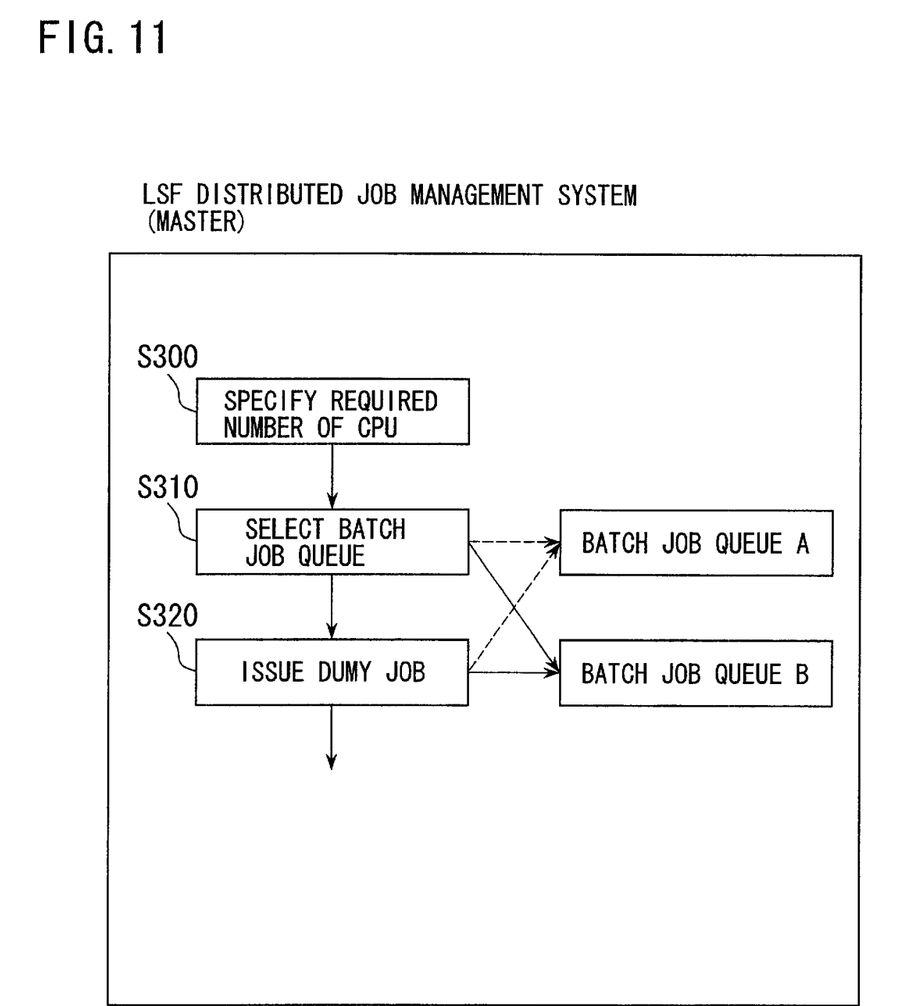
FIG. 11 is a flowchart illustrating a flow of processing until the issuance of dummy jobs in the LSF distributed job management system according to another embodiment of the present invention.

FIG. 11 is a flowchart illustrating a flow of processing until the issuance of dummy jobs in the LSF distributed job management system (master) in a distributed job integrated management system according to another embodiment of the present invention.

In this embodiment, a plurality of batch job queues, for example, a batch job queue A and a batch job queue B in FIG. 11, are provided in the LSF distributed job management system (master). When a job or jobs are to be processed in the Quickturn distributed job management system (slave), a command is inputted to the distributed job integrated management system which command includes information specifying the number of CPU's required by the job or jobs processed by the Quickturn distributed job management system (slave) (step S300). Then, a batch job queue is selected depending on the number of CPU's required (step S310), and thereafter dummy jobs are issued (step S320).

For example, a job or jobs whose number of CPU's required is equal to or smaller than 5 are injected into the batch job queue A, and a job or jobs whose number of CPU's required is equal to or larger than 6 are injected into the batch job queue B. It is possible to apportion jobs such that a job or jobs whose data scale, for example, number of gates of an LSI, is small are processed by the batch job queue A, and a job or jobs whose data scale is large are processed by the batch job queue B.

In this way, according to jobs to be processed, it is possible to apportion the jobs into any of different batch job queues, and thereby to decrease average scheduled waiting time of all the jobs.

As mentioned above, according to the present invention, it is not necessary to divide network resources every different distributed job management systems and, therefore, it is possible to effectively utilize the network resources. Also, between the master distributed job management system and the slave distributed job management system, the network resources required for the jobs of the slave side can be dynamically allocated. Therefore, if any of the network resources is available, it is possible to execute jobs of the slave side in a short time.

Also, according to the present invention, it is possible to share the same network resources between the different kinds of or heterogeneous distributed job management systems and to dynamically apportion the network resources between the master distributed job management system and the slave distributed job management system. Therefore, during a time when any job is not executed in the slave distributed job management system, other jobs injected from the master distributed job management system can occupy the network resources. As a result, the network resources are effectively utilized and a high speed processing can be realized.

In the foregoing specification, the invention has been described with reference to specific embodiments. However, one of ordinary skill in the art appreciates that various modifications and changes can be made without departing from the scope of the present invention as set forth in the claims below.

When there are a plurality of slave distributed job management systems, the master distributed job management system can determine which of the slave distributed job management systems will process the jobs according to the condition of usage of network resources, so that jobs or loads are uniformly distributed among the network resources or among the slave distributed job management systems.

Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A distributed job integrated management system used in a networked computer system which comprises a plurality of host computer systems coupled to a common network, and a plurality of heterogeneous distributed job management systems each processes inputted jobs by using said host computer systems, wherein one of said distributed job management systems is used as a master distributed job management system and the rest of said plurality of distributed job management systems are used as slave distributed job management systems, and said master distributed job management system determines allocation of resources of said host computer systems to said master distributed job management system and to said slave distributed job management systems, based on the condition of usage of said resources of said host computer systems.

2. A distributed job integrated management system as set forth in claim 1, wherein inputted jobs are allocated to said slave distributed job management systems or to said master distributed job management system via said master distributed job management system.

3. A distributed job integrated management system as set forth in claim 2, wherein said master distributed job management system has a master job queue for jobs to be processed by said master distributed job management system and a slave job queue for jobs to be processed by said slave distributed job management system, and inputted jobs are queued into said master job queue or into said slave job queue via said master distributed job management system.

4. A distributed job integrated management system as set forth in claim 1, wherein jobs are inputted from each of said plurality of host computer systems.

5. A distributed job integrated management system as set forth in claim 4, wherein jobs can be inputted from each of said host computer systems with a command designating whether said jobs are to be processed by said slave distributed job management system or by said master distributed job management system.

6. A distributed job integrated management system as set forth in claim 4, wherein jobs can be inputted from each of said host computer systems with a command designating a quantity of resources required for processing said jobs.

7. A distributed job integrated management system as set forth in claim 1, wherein when there are a plurality of said slave distributed job management systems, said master distributed job management system determine which of said slave distributed job management systems processes the jobs according to the condition of usage of network resources, so that jobs are uniformly distributed among said resources or among said slave distributed job management systems.

8. A distributed job integrated management system as set forth in claim 1, further comprising:
 a resource reservation portion which gives information on a number of CPU's in said host computer systems required for jobs of said slave distributed job management system to said master distributed job management system;
 a resource allocation portion which allocates resources for said jobs of said slave distributed job management system by using a host name list corresponding to said number of CPU's required for jobs of said slave distributed job management system;
 a slave main command injection portion which inputs a slave main command for processing jobs of said slave distributed job management system into said master distributed job management system;
 a slave main command monitoring portion which monitors execution of said slave main command; and
 a resource releasing portion which releases resources used for processing said jobs of said slave distributed job management system.

9. A distributed job integrated management system as set forth in claim 8, wherein said resource reservation portion issues dummy jobs to reserve resources used for processing jobs of said slave distributed job management system based on said number of CPU's required for jobs of said slave distributed job management system.

10. In a networked computer system comprising a plurality of host computer systems coupled to a common network, and a plurality of heterogeneous distributed job management systems each processes inputted jobs by using said host computer systems, a method of distributed job integrated management in which one of said distributed job management systems is used as a master distributed job management system and the rest of said plurality of distributed job management systems are used as slave distributed job management systems, and said master distributed job management system determines allocation of resources of said host computer systems to said master distributed job management system and to said slave distributed job management systems, based on the condition of usage of said resources of said host computer systems.

11. A method as set forth in claim 10, wherein inputted jobs are allocated to said slave distributed job management systems or to said master distributed job management system via said master distributed job management system.

12. A method as set forth in claim 11, wherein said master distributed job management system has a master job queue for jobs to be processed by said master distributed job management system and a slave job queue for jobs to be processed by said slave distributed job management system, and inputted jobs are queued into said master job queue or into said slave job queue via said master distributed job management system.

13. A method as set forth in claim 10, wherein jobs are inputted from each of said plurality of host computer systems.

14. A method as set forth in claim 13, wherein jobs can be inputted from each of said host computer systems with a command designating whether said jobs are to be processed by said slave distributed job management system or by said master distributed job management system.

15. A method as set forth in claim 13, wherein jobs can be inputted from each of said host computer systems with a command designating a quantity of resources required for processing said jobs.

16. A method as set forth in claim 10, wherein when there are a plurality of said slave distributed job management systems, said master distributed job management system determine which of said slave distributed job management systems processes the jobs according to the condition of usage of network resources, so that jobs are uniformly distributed among said resources or among said slave distributed job management systems.

17. A method as set forth in claim 10, further comprising:
 providing information on a number of CPU's in said host computer systems required for jobs of said slave distributed job management system to said master distributed job management system;
 allocating resources for said jobs of said slave distributed job management system by using a host name list corresponding to said number of CPU's required for jobs of said slave distributed job management system;
 inputting a slave main command for processing jobs of said slave distributed job management system into said master distributed job management system;
 monitoring execution of said slave main command; and
 releasing resources used for processing said jobs of said slave distributed job management system.

18. A method as set forth in claim 17, wherein said providing information on a number of CPU's comprises issuing dummy jobs corresponding to said number of CPU's required for jobs of said slave distributed job management system to reserve resources used for processing jobs of said slave distributed job management.

19. A storage medium storing a computer program for configuring a distributed job integrated management system used in a networked computer system which comprises a plurality of host computer systems coupled to a common network, and a plurality of heterogeneous distributed job management systems each processes inputted jobs by using said host computer systems, wherein one of said distributed job management systems is used as a master distributed job management system and the rest of said plurality of distributed job management systems are used as slave distributed job management systems, and said master distributed job management system determines allocation of resources of said host computer systems to said master distributed job management system and to said slave distributed job management systems, based on the condition of usage of said resources of said host computer systems.

* * * * *